(12) United States Patent
Tao et al.

(10) Patent No.: US 11,256,922 B1
(45) Date of Patent: Feb. 22, 2022

(54) SEMANTIC REPRESENTATION METHOD AND SYSTEM BASED ON AERIAL SURVEILLANCE VIDEO AND ELECTRONIC DEVICE

(71) Applicant: Tsinghua University, Beijing (CN)

(72) Inventors: Xiaoming Tao, Beijing (CN); Yiping Duan, Beijing (CN); Ziqi Zhao, Beijing (CN); Danlan Huang, Beijing (CN); Ning Ge, Beijing (CN)

(73) Assignee: TSINGHUA UNIVERSITY, Beijing (CN)

( * ) Notice: Subject to any disclaimer, the term of this patent is extended or adjusted under 35 U.S.C. 154(b) by 0 days.

(21) Appl. No.: 17/458,589

(22) Filed: Aug. 27, 2021

(30) Foreign Application Priority Data

Sep. 11, 2020 (CN) .......................... 202010957860.X

(51) Int. Cl.
*G06K 9/00* (2006.01)
*G06K 9/62* (2022.01)
*G06N 3/08* (2006.01)

(52) U.S. Cl.
CPC ..... *G06K 9/00718* (2013.01); *G06K 9/00335* (2013.01); *G06K 9/6218* (2013.01); *G06N 3/08* (2013.01); *G06K 2009/00738* (2013.01)

(58) Field of Classification Search
None
See application file for complete search history.

(56) References Cited

U.S. PATENT DOCUMENTS

2018/0197050 A1* 7/2018 Deutsch .............. G06K 9/6224
2018/0293464 A1* 10/2018 Martin .................... G06N 3/08

* cited by examiner

*Primary Examiner* — Leon Flores
(74) *Attorney, Agent, or Firm* — Bayramoglu Law Offices LLC

(57) ABSTRACT

A semantic representation method and system based on an aerial surveillance video, and an electronic device are provided. The semantic representation method includes: taking a pedestrian and a vehicle in the aerial surveillance video as a target for tracking; inputting a coordinate track of the target into a first semantic classifier to output a first semantic result of the target; performing semantic merging on the first semantic result, and inputting an obtained semantic merging result into a second semantic classifier to output a second semantic result of the target; and performing cluster analysis on the first semantic result to obtain a target group of the target, and according to the target group of the target, the obtained scene analysis result and the second semantic result, determining semantics of the aerial surveillance video.

10 Claims, 12 Drawing Sheets

SEMANTIC REPRESENTATION METHOD AND SYSTEM BASED ON AERIAL SURVEILLANCE VIDEO AND ELECTRONIC DEVICE

CROSS REFERENCE TO THE RELATED APPLICATIONS

This application is based upon and claims priority to Chinese Patent Application No. 202010957860.X, filed on Sep. 11, 2020, the entire contents of which are incorporated herein by reference.

TECHNICAL FIELD

The present disclosure relates to the field of video semantic representation technologies and, more particularly, relates to a semantic representation method and system based on an aerial surveillance video and an electronic device.

BACKGROUND

In aerial surveillance scenes, most of the scenes are outdoor scenes taken down from half a height. Targets in such scenes are mostly pedestrians or vehicles, which have a large number of scene targets, and a large number of parallel events and group events. However, the existing video event identification methods based on syntax structures have some obvious shortcomings: first, these syntax models can only deal with sequential events, but cannot deal with parallel events; second, because a number of targets contained in the sequence events is generally small, effects of dealing with multi-target events and an interaction between the multi-targets are poor, and the interaction between these targets is often concerned by users; and third, the lack of a unified semantic model paradigm leads to poor scalability of semantic symbol operations. Because of the above technical problems, in the semantic representation process of the prior art under the aerial surveillance situation, there are still problems of low parallel event processing efficiency and poor semantic representation effect.

SUMMARY

Considering this, an object of the present disclosure is to provide a semantic representation method and system based on an aerial surveillance video, and an electronic device, which can process multi-target events and parallel events in a scene by expressing and calculating semantics in a structured manner, improve a processing efficiency of the parallel events, and improve semantic representation effects on the multi-target events and the parallel events in the air surveillance video.

According to a first aspect, the embodiments of the present disclosure provide a semantic representation method based on an aerial surveillance video, wherein the method includes:

tracking a target in a surveillance video and determining tracking data of the target;

wherein, the target refers to a pedestrian and a running vehicle;

inputting a coordinate track of the target into a first semantic classifier to output a first semantic result of the target; wherein, the first semantic result represents a behavior of the target in an interval lower than a preset time;

performing semantic merging on the first semantic result, and inputting an obtained semantic merging result into a second semantic classifier to output a second semantic result of the target; wherein, the second semantic result represents a steering situation of the target in an interval no less than the preset time;

according to the tracking data of the target and a preset tab in the surveillance video, analyzing a scene in the surveillance video to obtain a scene analysis result; and performing cluster analysis on the first semantic result to obtain a target group of the target, and according to the target group of the target, the scene analysis result and the second semantic result, determining semantics of the surveillance video.

In some embodiments, the above-mentioned step of inputting the coordinate track of the target into the first semantic classifier to output the first semantic result of the target includes:

determining a semantic database of the target;

taking a trained semantic classification model as the first semantic classifier, and inputting the coordinate track of the target into the semantic classification model to output a behavior classification result of the target; and according to the behavior classification result of the target, the semantic database of the target and the preset time, determining the first semantic result of the target; wherein, the first semantic result represents the behavior of the target in the interval lower than the preset time.

In some embodiments, a support vector machine model is used as the trained semantic classification model; a kernel function used is a Gaussian kernel function; and a sklearn library function is used in the training process.

In some embodiments, the step of performing the semantic merging on the first semantic result includes:

initializing a semantic tuple; wherein, the semantic tuple is a five-element array set;

mapping the first semantic result into the initialized semantic tuple to complete the semantic merging; wherein, a first set in the five-element array set contains two numerals, which respectively store an id of the target and a kind of the target; a second set in the five-element array set is a numeral, which stores a semantic classification result; a third set of the five-element array set contains two vectors, which respectively store an abscissa sequence and an ordinate sequence of the target in the time interval; a fourth set in the five-element array set contains two numerals, which are respectively a header frame number and a tail frame number of a time interval to which the semantic tuple belongs; and a fifth set in the five-element array set is a list, which records all member ids of the target group in the time interval to which the semantic tuple belongs.

In some embodiments, the above-mentioned step of performing the cluster analysis on the first semantic result to obtain the target group of the target includes:

acquiring a semantic tuple the same as the fourth set in the first semantic result, and recording the semantic tuple as a temporary semantic tuple;

sampling a third set in the temporary semantic tuple according to a time sequence to obtain a sampling result; wherein, the sampling result refers to a plurality of multi-dimensional vectors, and a number of the multidimensional vectors is the same as that of the target;

using a scipy library function to cluster the multidimensional vectors for multiple times, and saving a clustering result in a preset dictionary; and inputting the dictionary into a preset graph data structure, and determining the target group of the target.

In some embodiments, the above-mentioned step of performing the semantic merging on the first semantic result, and inputting the obtained semantic merging result into the second semantic classifier to output the second semantic result of the target includes:

arranging semantic tuples of different periods in the target according to a time sequence to obtain a first temporary sequence; wherein, the first temporary sequence represents a movement situation of the target in each time period;

inputting the first temporary sequence into a preset error correction unit to obtain a second temporary sequence, and taking the second temporary sequence as the semantic merging result; and taking a trained steering classification model as the second semantic classifier, inputting the semantic merging result into the steering classification model to output a steering classification result of the target, and taking the steering classification result of the target as the second semantic result of the target.

In some embodiments, a bp neural network model is used as the trained steering classification model; 40 input layer nodes, 12 hidden layer nodes and 3 output layer nodes are provided; a ReLU activation function is used between an input layer and a hidden layer, and a softmax activation function is used between the hidden layer and an output layer; and the data set is divided into a training set, a validation set and a test set according to proportions of 60%, 20% and 20%; and a cross-entropy loss function is selected in the training process.

According to a second aspect, the embodiments of the present disclosure provide a semantic representation system based on an aerial surveillance video, wherein the system includes:

a tracking data determination module configured for tracking a target in a surveillance video and determining tracking data of the target; wherein, the target refers to a pedestrian and a running vehicle;

a first semantic result generation module configured for inputting a coordinate track of the target into a first semantic classifier to output a first semantic result of the target; wherein, the first semantic result represents a behavior of the target in an interval lower than a preset time;

a second semantic result generation module configured for performing semantic merging on the first semantic result, and inputting an obtained semantic merging result into a second semantic classifier to output a second semantic result of the target; wherein, the second semantic result represents a steering situation of the target in an interval no less than the preset time;

a scene analysis result generation module configured for, according to the tracking data of the target and a preset tab in the surveillance video, analyzing a scene in the surveillance video to obtain a scene analysis result; and a semantics determination module configured for performing cluster analysis on the first semantic result to obtain a target group of the target, and according to the target group of the target, the scene analysis result and the second semantic result, determining semantics of the surveillance video.

According to a third aspect, the embodiments of the present disclosure further provide an electronic device including a storage and a processor. The storage is stored with a computer program that can run on the processor, wherein the processor, when executing the computer program, implements the steps of the semantic representation method based on the aerial surveillance video mentioned in any possible embodiment of the first aspect above.

According to a fourth aspect, the embodiments of the present disclosure further a computer-readable storage medium with a nonvolatile program code executable by a processor, wherein the program code enables the processor to implement the steps of the semantic representation method based on the aerial surveillance video mentioned in any possible embodiment of the first aspect above.

The embodiments of the present disclosure have the following advantageous effects:

The present disclosure provides the semantic representation method and system based on the aerial surveillance video, and the electronic device. The method include the steps of taking the pedestrian and the vehicle in the surveillance video as the target for tracking; inputting the coordinate track of the target into the first semantic classifier to output the first semantic result of the target; wherein, the first semantic result represents the behavior of the target in the interval lower than the preset time; performing semantic merging on the first semantic result, and inputting the obtained semantic merging result into the second semantic classifier to output the second semantic result of the target; wherein, the second semantic result represents the steering situation of the target in the interval no less than the preset time; according to the tracking data of the target and the preset tab in the surveillance video, analyzing the scene in the surveillance video to obtain the scene analysis result; and finally performing cluster analysis on the first semantic result to obtain the target group of the target, and according to the target group of the target, the scene analysis result and the second semantic result, determining the semantics of the surveillance video. According the method, the semantics is expressed and calculated in a structured manner, so that the multi-target events and the parallel events in the scene can be processed, the processing efficiency of the parallel events is improved, and the semantic representation effects on the multi-target events and the parallel events in the air surveillance video are improved.

Other features and advantages of the present disclosure will be set forth in the following specification, or some features and advantages can be inferred or determined without doubt from the specification, or can be learned by implementing the above technology of the present disclosure.

To make the above objects, features and advantages of the present disclosure more obvious and easier to understand, the preferred embodiments will be described in detail below in conjunction with the attached drawings.

BRIEF DESCRIPTION OF THE DRAWINGS

To illustrate the technical solutions in the embodiments of the present disclosure or in the related art more clearly, the drawings used in the description of the embodiments or the prior art will be briefly described below. Obviously, the drawings in the following description are merely some embodiments of the present disclosure. For those of ordinary skills in the art, other drawings can also be obtained based on these drawings without going through any creative work.

REFERENCE NUMERALS

Figure 1:
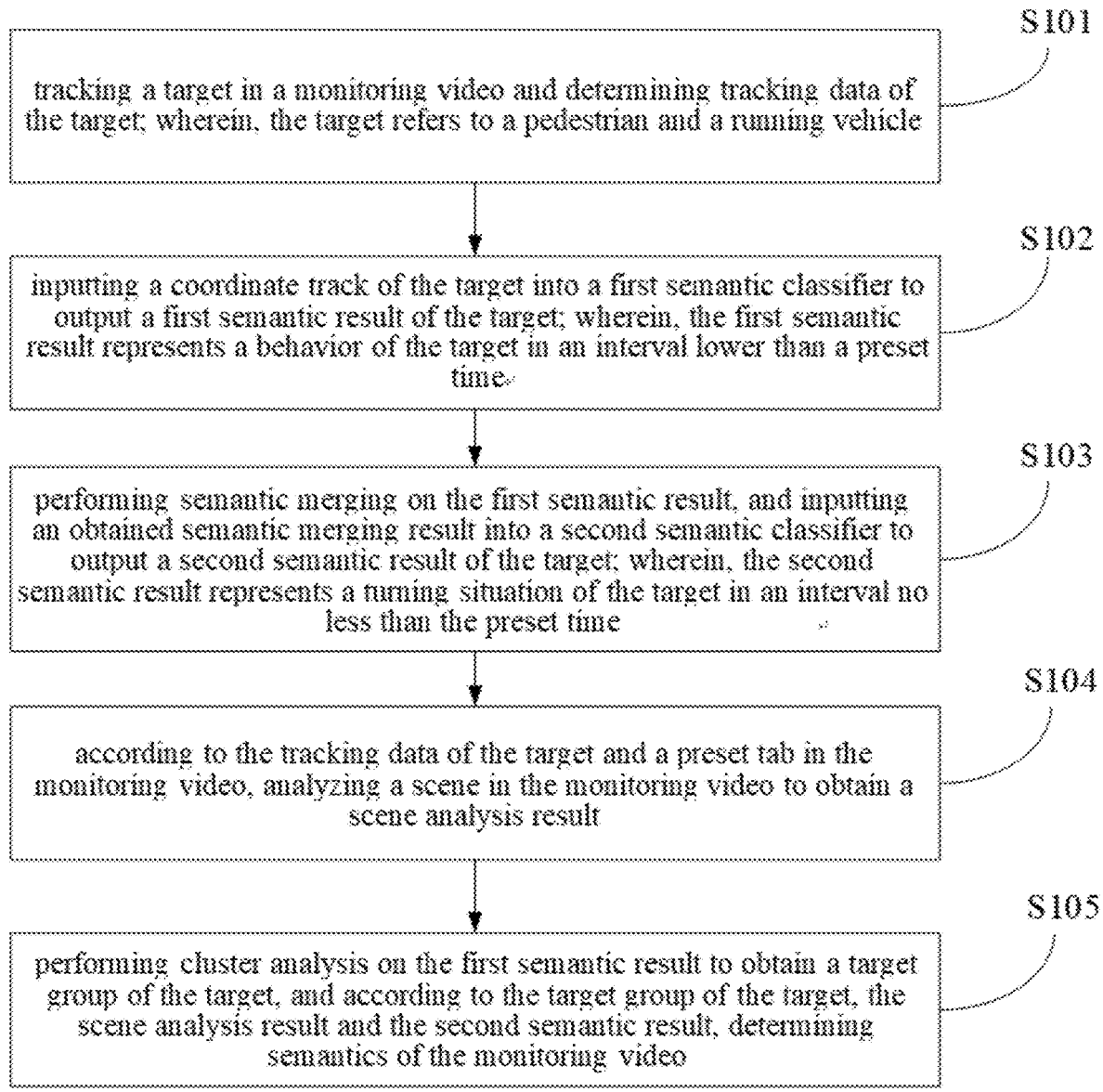
FIG. 1 is a flow chart of a semantic representation method based on an aerial surveillance video provided by an embodiment of the present disclosure.

1110 refers to tracking data determination module; 1120 refers to first semantic result generation module; 1130 refers to second semantic result generation module; 1140 refers to scene analysis result generation module; 1150 refers to semantics determination module; 101 refers to processor; 102 refers to memory; 103 refers to bus; and 104 refers to communication interface.

DETAILED DESCRIPTION OF THE EMBODIMENTS

To make the objects, technical solutions and advantages of the embodiments of the present disclosure clearer, the following clearly and completely describes the technical solutions of the present disclosure with reference to the drawings. Apparently, the described embodiments are merely some but not all of the embodiments of the present disclosure. Based on the embodiments of the present disclosure, all other embodiments obtained by those of ordinary skills in the art without going through any creative work shall fall within the protection scope of the present disclosure.

Image (video) media are the most important means to acquire information, because image (video) data contains more information than other media. For decision-makers and users, information about interested targets given by the image data is the most intuitive, but there is a lot of redundancy in the image information. Performing semantic representation on video targets obtained in real scenes is beneficial for the decision-makers and the users to understand and judge a scene situation from the level of knowledge and semantics. Performing semantic representation on images/videos is a process of processing pixel-level image information into target-level semantic information, wherein the semantic information here refers to attributes and behaviors of the target, and other contents. Generally speaking, the video semantic representation may be divided into two steps of: first, identifying events in the video, and then using a certain regular language to express these events.

Most of the existing video semantic representation methods may be classified as video event identification methods based on syntactic structures. The specific process is as follows: first, inputting a section of video, and independently detecting sub-events in each time period through a detector; then, according to a predefined sub-event semantic database, abstracting these outputs of the detector into specific symbols which expand into a symbol sequence as time goes by, that is, a sub-event sequence; and finally, analyzing and interpreting this symbol sequence according to context information and scene rules, so as to generate a coherent long-time semantic representation of the whole event. The sub-event identification may be realized by various machine learning methods, the scene rules in the semantic interpretation also change with the change of application scenes, and the methods of realizing these contents in different specific tasks are also different.

Performing semantic representation on the video targets, which is, to identify and express the semantics contained in the video targets, is a task similar to video content understanding, but not completely the same. The video content understanding tends to express semantics of a whole video with an abstract symbol, and a standard answer may usually be set, so a classifier may be trained to complete video content understanding. For the semantic representation on the video targets, it is necessary to identify attributes and behaviors of each target individual or each other, and express the attributes and behaviors in a certain language, which is similar to "looking at figures and writing words", but there is no standard answer. Therefore, an applicability of a method is generally used to evaluate a quality of a video semantic representation method, that is, whether the method is suitable for an application scene, whether the method can handle complicated situations, and whether semantic representation results of the method are convenient to understand and use.

The video event identification methods based on the syntactic structure have some obvious shortcomings: first, these syntactic models can only deal with sequential events, but cannot deal with parallel events; second, because a number of targets contained in the sequential events is generally small, most of these syntactic models cannot deal with multi-target events, and certainly cannot deal with interaction between multi-targets, while the interaction between these targets is often concerned by users; and third, due to the needs of context, these syntactic models usually adopt different symbol structures, and it is difficult to determine a unified semantic model paradigm, so it is inconvenient to further operate the semantic symbols. An aerial monitoring scene is namely an outdoor scene taken down from half a height, in which the main scene targets are mostly pedestrians or other vehicles. Moreover, a number of the scene targets may be large, and there are a large number of parallel events and group events. For the aerial surveillance scene, the traditional video event identification methods based on the syntactic structure can neither handle the parallel events nor the multi-target events, which is obviously unsuitable.

In conclusion, in the semantic representation process of the prior art under the aerial surveillance situation, there are still problems of low parallel event processing efficiency and poor semantic representation effect.

In light of this, the embodiments of the present disclosure provide a semantic representation method and system based on an aerial surveillance video, and an electronic device, which can process a multi-target event and parallel events in a scene by expressing and calculating semantics in a structured manner, improve a processing efficiency of the parallel events, and improve semantic representation effects on the multi-target event and the parallel events in the air surveillance video.

To facilitate the understanding of the embodiments, firstly, the semantic representation method based on the aerial surveillance video disclosed in the embodiments of the present disclosure is introduced in detail.

Referring to the semantic representation method based on the aerial surveillance video shown in FIG. 1, the method includes the following steps:

Step S101: tracking a target in a surveillance video and determining tracking data of the target; wherein, the target refers to a pedestrian and a running vehicle.

The surveillance videos may come from reconnaissance aircrafts, unmanned aerial vehicles, satellites, and the like, and most of the surveillance videos are overhead videos in outdoor scenes. The targets to be tracked refer to pedestrians and vehicles, wherein the pedestrians are mostly in motion; the vehicles refer to various vehicles in a running state, such as bikes, skateboards, cars, buses, golf carts and the like.

The semantics of the above-mentioned pedestrians and vehicles are mainly related to changes of a spatial position of the target, such as whether to move, whether to stop, steering direction, and the like.

It can be known according to a realization principle of semantics that, because different scenes will inevitably produce different concepts, a complete semantics concept depends on a specific and fixed scene; then semantics of the scene is analyzed to determine a semantic database of the scene, that is, possible attributes of the scene targets, possible actions to be performed, and possible relationships between the targets. The semantic database of the scene is a finite set, and the semantics of the target in the following steps can only be evaluated in the semantic database.

After the targets in the surveillance video are determined, these targets need to be tracked to determine tracking data of the targets. The tracking data of the targets may be directly obtained from a tracking data set of the targets, or may be obtained by a target tracking algorithm.

Step S102: inputting a coordinate track of the target into a first semantic classifier to output a first semantic result of the target; wherein, the first semantic result represents a behavior of the target in an interval lower than a preset time.

After the coordinate track is acquired, the coordinate track is input into the first semantic classifier as input data. Because the targets in the aerial surveillance video are dynamic, it is necessary to sample and mark the target tracks at a certain time interval, and then carry out semantic classification by the first semantic classifier to obtain the first semantic result of the target.

The first semantic result represents the behavior of the target in the interval lower than the preset time. In the specific implementation process, the first semantic result may be recorded as a short-time semantic result, for example, the time interval is set as 3 seconds, the target is the pedestrian or a bike. The pedestrian as a single target has two short-time semantics including walk and stay. The bike has three semantics including ride, walk and stop. As the first semantic result, the above behavior may be directly acquired after the coordinate track of the target is input to the first semantic classifier. The above behavior is also used as input data for the generation, training and acquisition of the first semantic classifier.

Step S103: performing semantic merging on the first semantic result, and inputting an obtained semantic merging result into a second semantic classifier to output a second semantic result of the target; wherein, the second semantic result represents a steering situation of the target in an interval no less than the preset time.

In this step, semantic merging is performed on the first semantic result first to obtain the semantic merging result. Specifically, the first semantic result is mapped according to a preset relationship, and finally the semantic tuple in a special form is obtained. The semantic tuple contains various semantic classification results and coordinate data of the target and data of related sub-members. For example, the semantic tuple may be a four-element tuple, a five-element or a six-element tuple, wherein each tuple is an array, a set, a dictionary and a numeral, and used to represent various semantics and corresponding target data thereof. The semantic merging result may be regarded as a special formatting process performed on the first semantic result, and the formatted semantic result is beneficial to subsequent processing and semantic generation.

Sorting may be performed during the semantic merging process according to various tuples contained in the semantic tuple. Specifically, the semantic tuples sequence belonging to the same target in different time periods may be arranged in a time sequence to obtain a semantic tuple sequence of the target, wherein the sequence reflects a movement situation of the target in each time period. The obtained semantic merging result is input into the second semantic classifier to output the second semantic result of the target; wherein, the second semantic result represents the steering situation of the target in the interval no less than the preset time. In the concrete implementation process, the second semantic result may be recorded as a long-time semantic result. It can be seen that the second semantic classifier in this step is used to acquire a moving direction of the target. After inputting the semantic tuple sequence of the target into the second semantic classifier, the steering situation of the target may be generated according to a motion track of the target.

Step S104: according to the tracking data of the target and a preset tab in the surveillance video, analyzing a scene in the surveillance video to obtain a scene analysis result.

Scene marking is the key to the scene analysis result. When marking a scene, according to a landmark or a special place in the aerial surveillance video, a spatial relationship between a target track and the landmark may be analyzed to count some macro information about the scene. For example, in an intersection surveillance video, coordinates of four intersections may be marked and target passing through the intersections may be monitored to count a number of target entering and leaving each intersection.

Step S105: performing cluster analysis on the first semantic result to obtain a target group of the target, and according to the target group of the target, the scene analysis result and the second semantic result, determining semantics of the surveillance video.

In this step, firstly, the target group is acquired, wherein the target group refers to a set formed when the target of the same kind is gathered together. In the aerial surveillance video, similar target often gathers together. For example, at traffic lights such as intersections, pedestrians and bikes will gather near a stop line, and it is easy to misjudge when gathering, that is, the pedestrians and the bikes are judged to be the target of the same kind, which leads to errors in the final semantic judgment. Therefore, it is necessary to judge the target groups.

The target groups may be judged by cluster analysis, and the specific realization process may be realized by arranging the semantic tuples of the target in a time sequence, then clustering the arrangement results, and using a graph data structure to identify the groups, and finally judging whether the target groups are the same target group by a node data of connected components.

After obtaining the target group of the target, the semantics of the surveillance video is finally determined with reference to the target group, the scene analysis result and the second semantic result. The target semantics in the video includes a serial number and a behavior of the target, a time period when the behavior is completed, a number of video frames when the behavior is completed, and so on. These semantic data of the target may be printed directly in the aerial surveillance video, or printed in a text as a log file.

From the semantic representation method based on the aerial surveillance video provided in the embodiments of the present disclosure, it can be known that this method introduces the identification process to improve the traditional video event identification methods based on the syntactic structure, so that this method can handle multi-target events and parallel events. Moreover, the semantic tuple, a structured semantic model, is used to represent the sub-events of the target. This structured model is convenient for a computer to calculate and process semantic symbols. This method directly uses the tracking results of the target as input data, but does not use low-level (pixel) and middle-level (color, texture, etc.) features of the video, which is equivalent to directly filtering redundant information in the video data. This is because that the middle-level features have almost no semantic meaning. Therefore, this method can deal with the multi-target events and the parallel events in the scene, which improves the processing efficiency of the parallel events and improves the semantic representation effects on the multi-target events and the parallel events in the aerial surveillance video.

In some embodiments, the above-mentioned step S102 of inputting the coordinate track of the target into the first semantic classifier to output the first semantic result of the target includes:

Step S201: determining a semantic database of the target.

The determined semantic database is a scene semantic database of the target, i.e., possible attributes and possible actions of the target in the scene as well as possible relationships between the targets, etc. The scene semantic database is a finite set, and the semantics of the target in the following steps can be only evaluated in the semantic database. In the aerial surveillance scene, most of the targets are pedestrians and other vehicles, and the semantic information of the target is mainly related to the changes of spatial positions, such as moving and stopping.

Step S202: taking a trained semantic classification model as the first semantic classifier, and inputting the coordinate track of the target into the semantic classification model to output a behavior classification result of the target.

The first semantic classifier in this embodiment is a convolutional neural network with a semantic classification function. During the concrete implementation process, a support vector machine model is used as the trained semantic classification model; a kernel function used is a Gaussian kernel function; and a sklearn library function is used to implement the training process.

Step S203: according to the behavior classification result of the target, the semantic database of the target and the preset time, determining the first semantic result of the target.

According to the semantic database of the target acquired in step S201 and the behavior classification result acquired in step S202, the first semantic result is obtained in combination with the preset time interval. It is visible that the first semantic result represents the behavior of the target in the interval lower than the preset time. The obtained first semantic result may be used as input data of model training for the training process of the semantic classification model.

Figure 3:
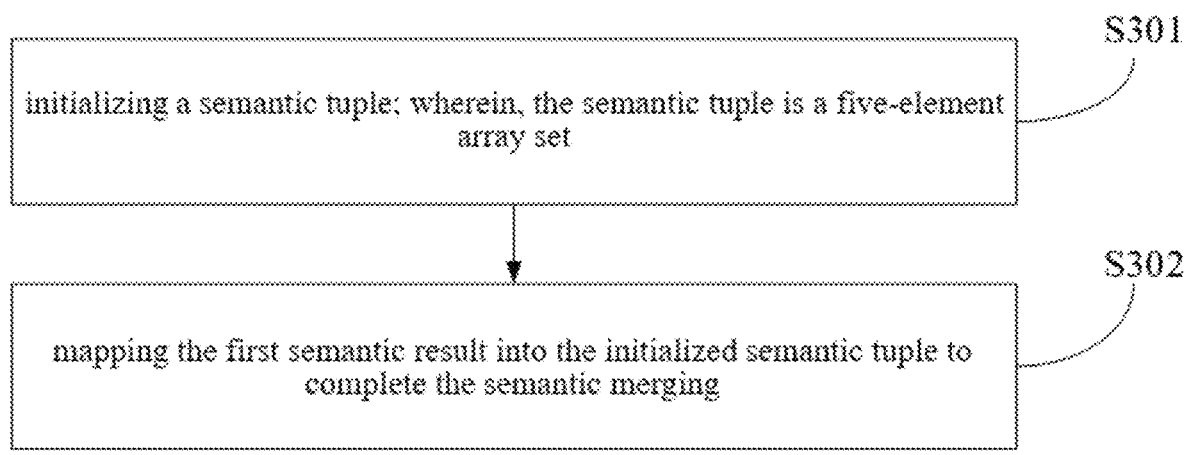
FIG. 3 is a flow chart of performing semantic merging on the first semantic result in the semantic representation method based on the aerial surveillance video provided by the embodiment of the present disclosure.

In some embodiments, the step of performing the semantic merging on the first semantic result, as shown in FIG. 3, includes:

Step S301: initializing a semantic tuple; wherein, the semantic tuple is a five-element array set.

A first set in the five-element array set contains two numerals, which respectively store an id of the target and a kind of the target; a second set in the five-element array set is a numeral, which stores a semantic classification result; a third set of the five-element array set contains two vectors, which respectively store an abscissa sequence and an ordinate sequence of the target in the time interval; a fourth set in the five-element array set contains two numerals, which are respectively a header frame number and a tail frame number of a time interval to which the semantic tuple belongs; and a fifth set in the five-element array set is a list, which records all member ids of the target group in the time interval to which the semantic tuple belongs.

Step S302: mapping the first semantic result into the initialized semantic tuple to complete the semantic merging.

Specifically, the second set in the five-element array set is arranged according to time to obtain a sequence, wherein the sequence reflects a movement situation of the target in each time period. The sequence first passes through an error correction unit which is used to correct burrs in the sequence. It is assumed that short-time semantics of the target in a certain time period is stay, and short-time semantics of at least three consecutive time periods before and after are walk, the short-time stay of the current time period is considered as burr noise and corrected as walk. Then, semantic merging is performed, which combines continuous components in the sequence and records a starting frame of the continuous components.

Figure 4:
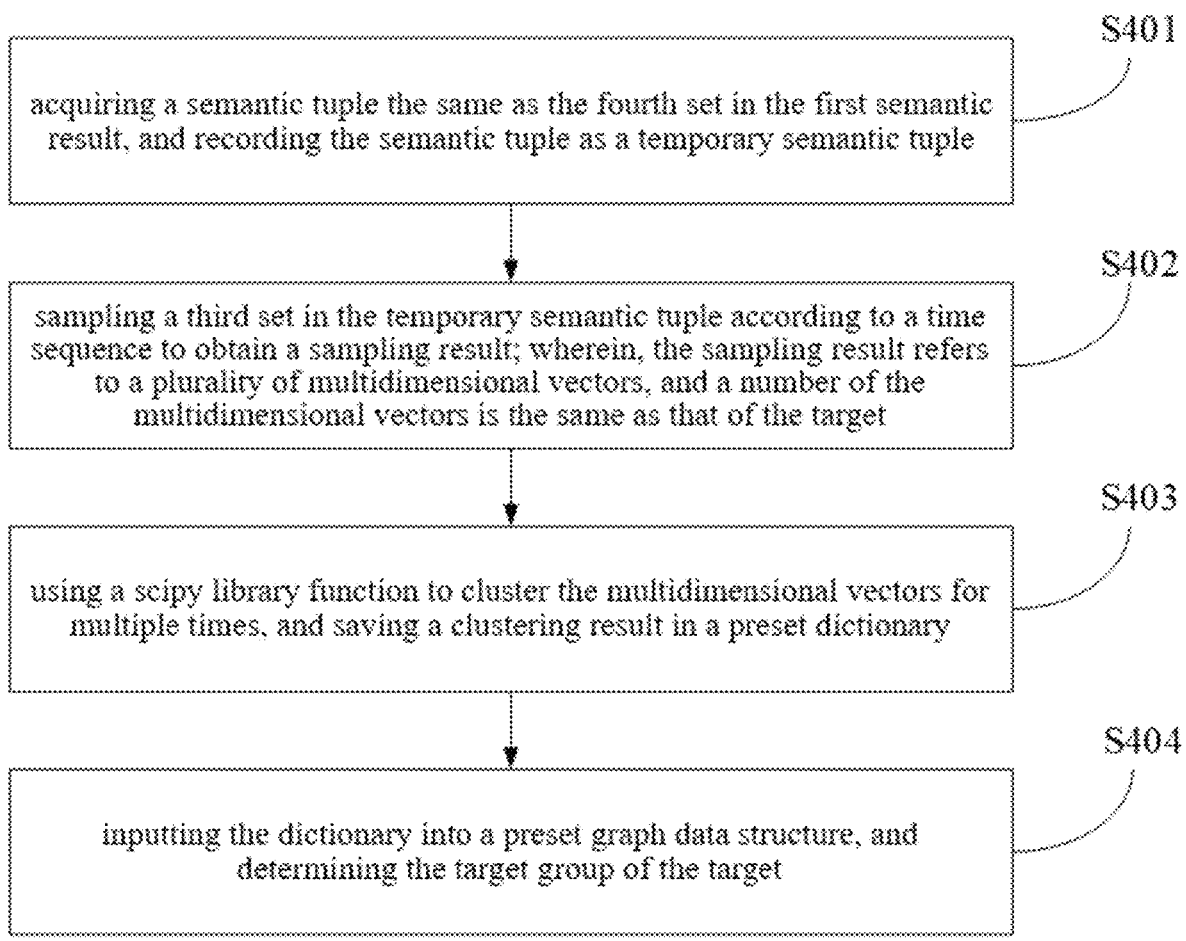
FIG. 4 is a flow chart of performing cluster analysis on the first semantic result to obtain a target group of the target in the semantic representation method based on the aerial surveillance video provided by the embodiment of the present disclosure.

In some embodiments, the above-mentioned step of performing the cluster analysis on the first semantic result to obtain the target group of the target, as shown in FIG. 4, includes:

Step S401: acquiring a semantic tuple the same as the fourth set in the first semantic result, and recording the semantic tuple as a temporary semantic tuple.

This step may be regarded as a data preprocessing operation, which puts the tuples the same as the fourth set in the five-element tuple together in a time sequence for subsequent sampling.

Step S402: sampling a third set in the temporary semantic tuple according to a time sequence to obtain a sampling result; wherein, the sampling result refers to a plurality of multidimensional vectors, and a number of the multidimensional vectors is the same as that of the target.

The third sets of these tuples are sampled, wherein the third set contains coordinates of target points within a time interval (e.g., 3 seconds), and the target points are sampled at equal intervals. 9 points are sampled in total to obtain an 18-dimensional vector. In each time period, a number of the 18-dimensional vectors is a number of targets in the scene in the time period.

Step S403: using a scipy library function to cluster the multidimensional vectors for multiple times, and saving a clustering result in a preset dictionary.

According to the time sequence, these vectors are clustered in each time period. A bottom-up hierarchical clustering algorithm is used as the clustering method, and a scipy library function in python is used in the process of implementing clustering, wherein the two functions linkage and fcluster in scipy.cluster.hierarchy are the core functions. The linkage function calculates a between class distance and realizes hierarchical clustering, and core parameters of the linkage function are "method" connection standard and "metric" distance standard, with "euclidean" distance as the distance standard and group "average" as the connection standard. The clustering is performed twice in each time period, and thresholds of the two clustering are different, which are 0.6 and 0.8, respectively. Clustering results are stored in two dictionaries, which are denoted as d1 and d2.

Step S404: inputting the dictionary into a preset graph data structure, and determining the target group of the target.

A graph data structure is used for group identification. A corresponding relationship between the graph and the scene target is as follows: each node in an undirected graph corresponds to one target in the scene. If there is an edge between two nodes, it means that the two targets belong to the same group, so each connected component represents one target group.

Figure 5:
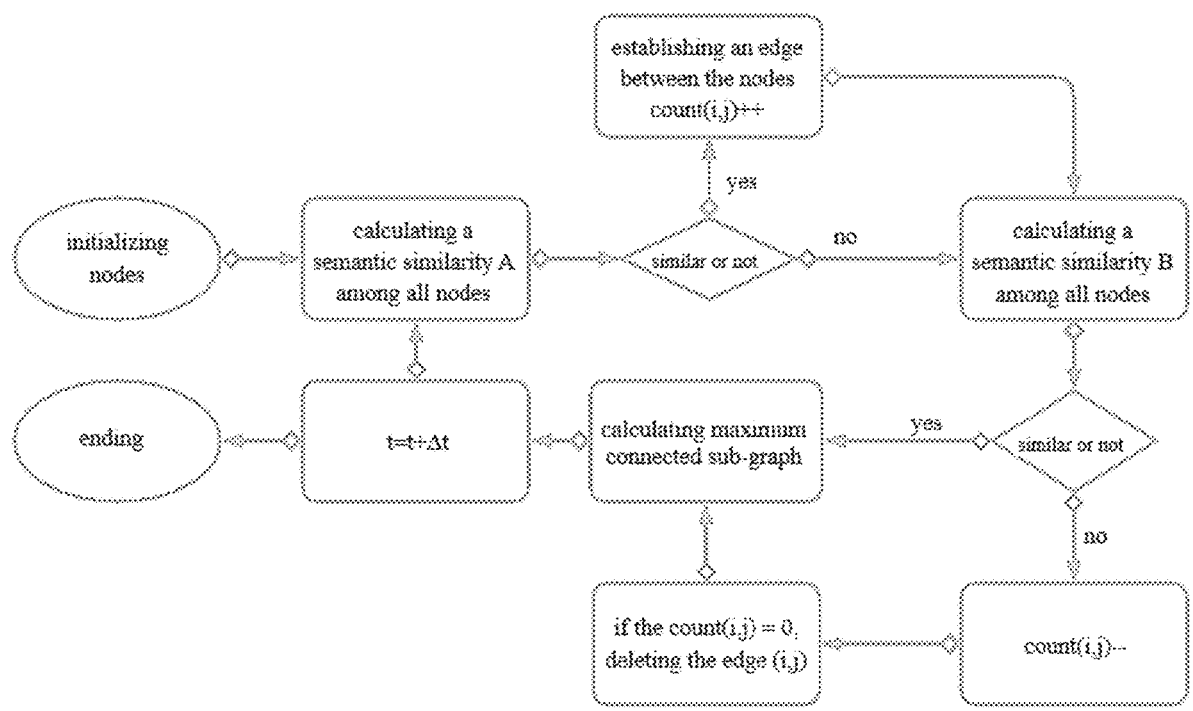
FIG. 5 is another flow chart of performing cluster analysis on the first semantic result to obtain a target group of the target in the semantic representation method based on the aerial surveillance video provided by the embodiment of the present disclosure.

Specifically, another calculation process of the above target group is as shown in FIG. 5:

(a) First, nodes are initialized, t=0, nodes are established according to a number of the scene targets, and there is no edge connection between the nodes. A value of an initialization matrix count(i,j) indicates a time correlation degree between a node i and a node j. In this case, the count matrix is initialized to a zero matrix.

(b) a semantic similarity A is calculated among all nodes, and if the node i and the node j are similar, an edge is established between the two nodes (if there is an edge between i and i, no new edge will be added), and the count(i,j) is increased automatically (if the count(i,j) is greater than or equal to 3, the count(i,j) is not increased automatically). A method for calculating the semantic similarity A is: checking situations of the node i and the node j in the clustering result d1. If i and j belong to the same group in at least 3 time periods in next 6 time periods (including this time period), it is considered that the node i and the node j are semantically similar.

(c) A semantic similarity B is calculated among all nodes, and if the node i is not similar to the node, the count(i,j) is decreased automatically (if the count(i,j) is equal to 0, the count(i,j) is not decreased automatically). If the count(i,j) is equal to 0, an edge between i and j is deleted. A method for calculating the semantic similarity B is: checking situations of the node i and the node j in the clustering result d2. If i and j belong to different groups in this time period, it is considered that the node i and the node j are semantically different.

(d) In this time period, the connected components are calculated for the whole graph, and the nodes belonging to the same connected component are members of the same group, and G members of the semantic tuple are updated according to this.

(e) t=t+Δt. The steps (a), (b), (c) and (d) are repeated until the video is ended.

Figure 6:
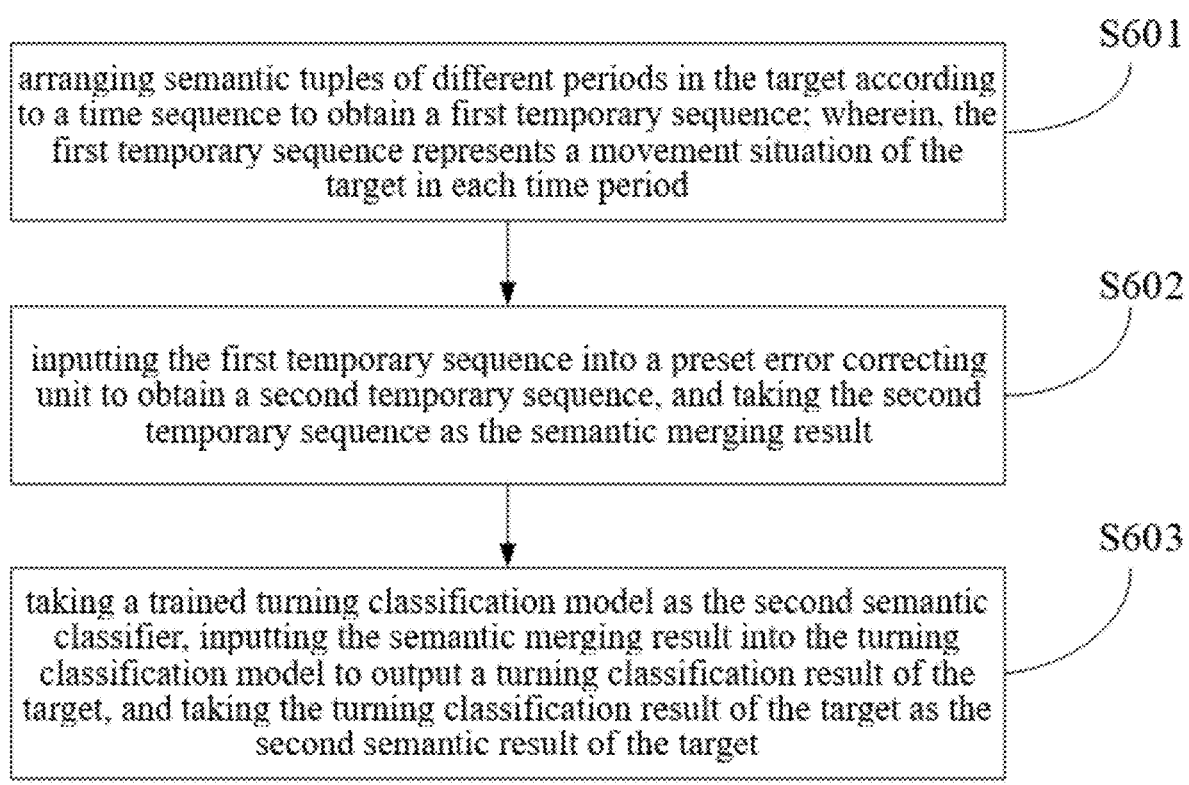
FIG. 6 is a flow chart of step S103 in the semantic representation method based on the aerial surveillance video provided by the embodiment of the present disclosure.

In some embodiments, the above-mentioned step S103 of performing the semantic merging on the first semantic result, and inputting the obtained semantic merging result into the second semantic classifier to output the second semantic result of the target, as shown in FIG. 6, includes:

Step S601: arranging semantic tuples of different periods in the target according to a time sequence to obtain a first temporary sequence; wherein, the first temporary sequence represents a movement situation of the target in each time period.

This step is a sorting process of the semantic tuples. Taking a five-element host set as an example, the second set in the five-element array set is arranged according to time to obtain a sequence, and the semantic tuples belonging to the same target in different time periods are arranged in a time sequence, which reflects the movement situation of the target in each time period.

Step S602: inputting the first temporary sequence into a preset error correction unit to obtain a second temporary sequence, and taking the second temporary sequence as the semantic merging result.

Due to the abnormality in data gathering and processing, the first temporary sequence obtained will contain some special data, which are burr data in the sequence. These burr data will affect the semantic representation effect. Therefore, it is necessary to correct the error of the sequence and remove the burr data. Specifically, the first temporary sequence first passes through an error correction unit which is used to correct burrs in the sequence. It is assumed that short-time semantics of the target in a certain time period is stay, and short-time semantics of at least three consecutive time periods before and after are walk, the short-time stay of the current time period is considered as burr noise and corrected as walk. The first temporary sequence after deburring is a second temporary sequence. The second temporary sequence is used as the semantic merging result for the following steps.

Step S603: taking a trained steering classification model as the second semantic classifier, inputting the semantic merging result into the steering classification model to output a steering classification result of the target, and taking the steering classification result of the target as the second semantic result of the target.

The second semantic classifier is a neural network model trained in advance. In the specific embodiment, a bp neural network model is used as the trained steering classification model above. 40 input layer nodes, 12 hidden layer nodes and 3 output layer nodes are provided; a ReLU activation function is used between an input layer and a hidden layer, and a softmax activation function is used between the hidden layer and an output layer; the data set is divided into a training set, a validation set and a test set according to proportions of 60%, 20% and 20%; and a cross-entropy loss function is selected in the training process. The steering classification data is collected and marked from the original aerial surveillance video. The marked samples are a track of some targets passing through the intersections. The steering situation of these motion tracks is clear, which is suitable for being used as a training data set of the steering classifier. The data is sampled equidistantly, and a number of sampling points is 20, so each sample is a vector with a length of 40 (20 x coordinates and 20 y coordinates).

The semantic representation method based on the aerial surveillance video mentioned in the above embodiment is simulated with a certain scene data set, and the specific process is as follows:

A public Stanford Drone Dataset is adopted as the data set, which is a target tracking data set, and contents thereof include images and videos of various targets (besides pedestrians, bikes, skateboards, cars, buses and golf carts) in real world outdoor environments (such as university campuses). The data set consists of eight unique scenes with a total of 60 videos.

The first semantic classifier marks data from 8 videos in 3 scenes as training data sets. There are 6,898 data sets used by pedestrians, including 4,198 walk and 2,698 stay, and there are 2,286 data sets used by bikes, including 864 ride, 693 walk and 729 stop. The samples are randomly divided, wherein 40% are training sets and 60% are test sets.

The second semantic classifier marks data from 6 videos in 2 scenes as training data sets, and finally marks 479 samples, including 269 go straight, 102 turn left and 108 turn right. The data sets are divided into training sets, validation sets and test sets according to proportions of 60%, 20% and 20%. Superparameters are set as follows: learning rate is $6 \times 10^{-3}$, batchsize is 10, an Adam optimizer is adopted, and training is stopped when epoch is 25.

It has been said before that the semantic representation on the video targets needs to identify the attributes and behaviors of each target individual or each other, and express the attributes and behaviors in a certain language, which is similar to "looking at figures and writing words", and there is no standard answer. In addition, because no other people have done similar experiments on the same data set, it is difficult to evaluate the experimental results by comparison. Therefore, an applicability of the method is generally used to evaluate a quality of a video semantic representation method, that is, whether the method is suitable for application scenes, whether the method can handle suitable situations, and whether the semantic representation result of the method is convenient to understand and use. According to the features of the aerial surveillance scene, the method provided by the present disclosure can not only analyze the motion behaviors of the targets such as pedestrians and bikes, but also consider the problem that there are many targets in the scene, and introduces the cluster analysis of the targets to identify the target groups, so that the method is very suitable for this application scene.

Figure 7:
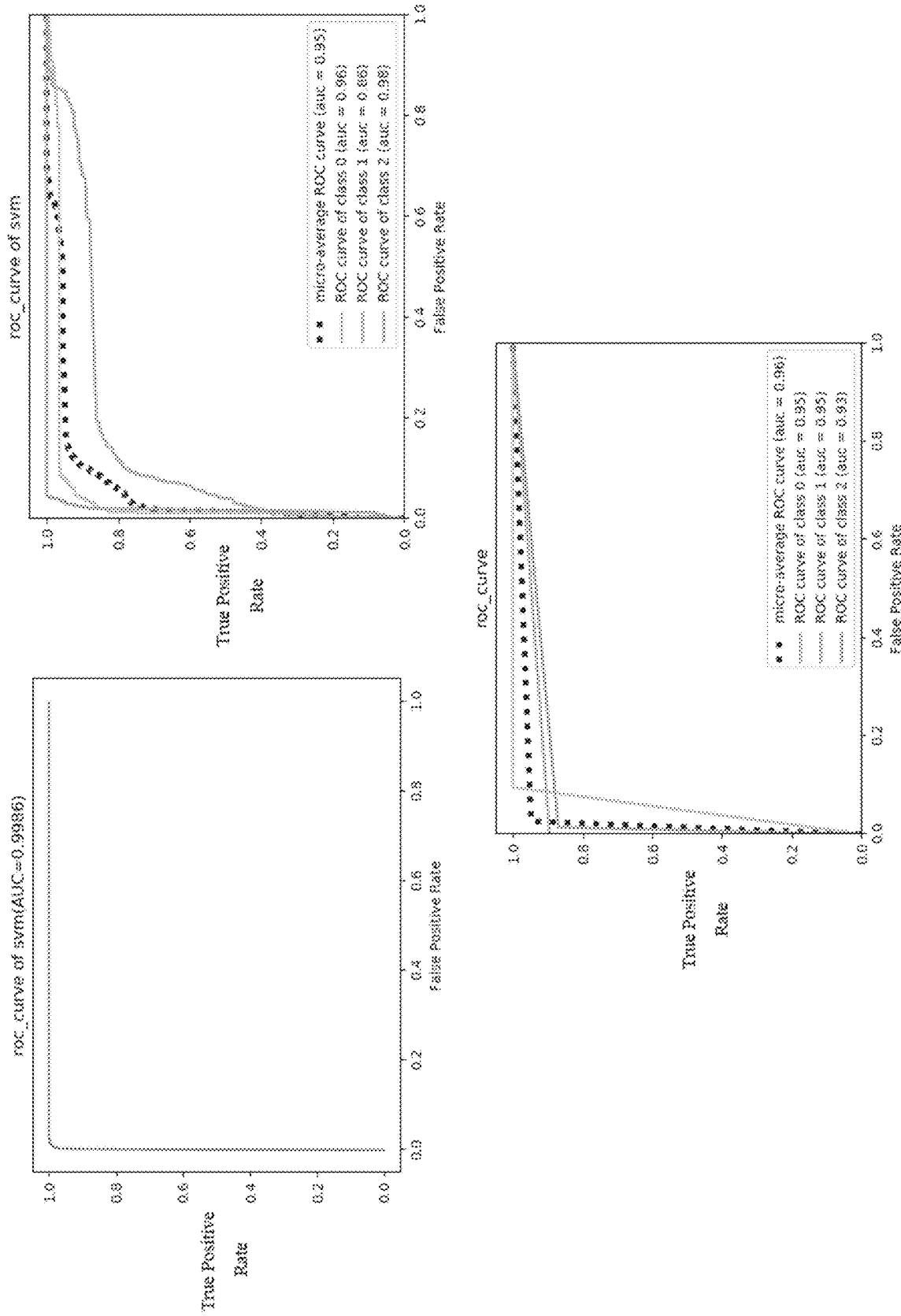
FIG. 7 is an ROC curve of a single-target short-time semantic classifier and a steering classifier in the semantic classification results obtained by adopting the semantic representation method based on the aerial surveillance video provided by the embodiment of the present disclosure.

In addition, an effectiveness of an algorithm may be evaluated from two aspects, one is an objective index of the classifier, and the other is a visual verification result of the semantic result. Firstly, the objective index of the classifier is given, as shown in FIG. 7 which is an ROC curve of a single-target short-time semantic classifier and a steering classifier. To measure performances of the classifier, an area (AUC) value under a receiver operator characteristic curve (ROC) is introduced as an index to the test result of the test set. The ROC curve is used to show a relationship between a true positive rate and a false positive rate of two classification results. For multi-classification problems, the ROC curve may also be drawn for each class. The upper left figure in FIG. 7 shows a single-target short-time semantic classifier for pedestrians, the upper right figure in FIG. 7 shows a single-target short-time semantic classifier for bikes, and the lower figure in FIG. 7 shows a steering classifier. It can be observed from FIG. 7 that the AUC value of the pedestrian classifier is very close to 1, indicating that the classifier can almost completely separate two classes of samples. In the bike classifier, ride (AUC=0.96) and stop (AUC=0.98) have very good classification performances, while the class walk (AUC=0.86) has slightly worse performances, but the average curve (AUC=0.95) shows that the overall performance of the classifier is very good. The steering classifier has good classification performances for three kinds of steering situations, and the average AUC value reaches 0.96.

Figure 8:
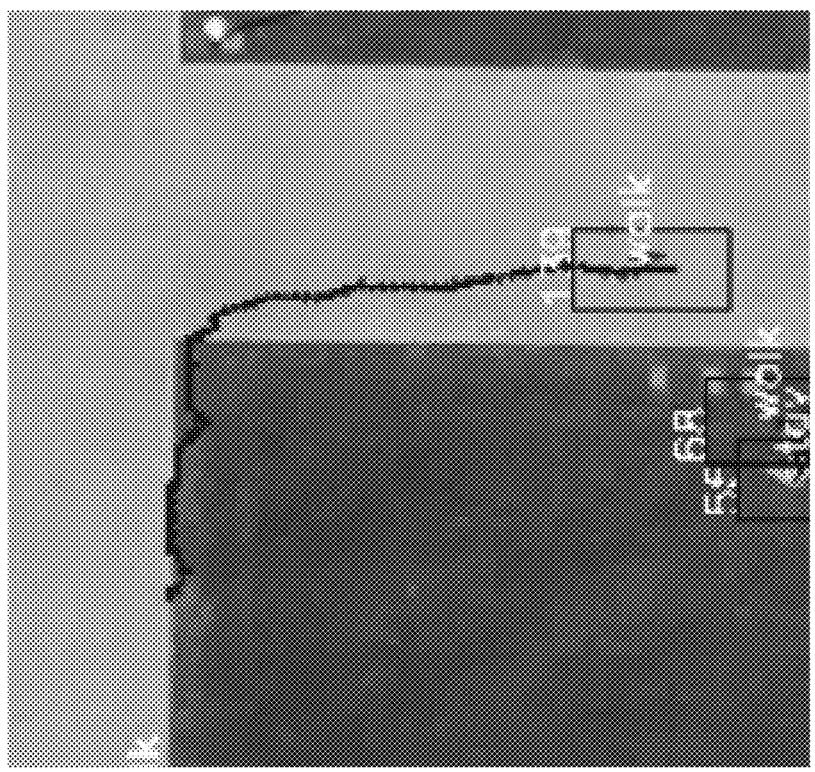
FIG. 8 is a single-target long-time semantic result in the semantic classification results obtained by adopting the semantic representation method based on the aerial surveillance video provided by the embodiment of the present disclosure.
Figure 8:
Figure 9:
FIG. 9 is a group identification result in the semantic classification results obtained by adopting the semantic representation method based on the aerial surveillance video provided by the embodiment of the present disclosure.
Figure 10:
FIG. 10 is a scene analysis result in the semantic classification results obtained by adopting the semantic representation method based on the aerial surveillance video provided by the embodiment of the present disclosure.

The semantic results are output to the video to visually verify correctness thereof, as shown in FIGS. 8, 9 and 10.

FIG. 8 shows the single-target long-time semantic result, wherein the left figure is a schematic diagram of printing a result string in the video and playing the same synchronously. In addition, the track of the target may be visualized in the video to verify the correctness of the result. For example, to verify the result field "pedestrian 139: turn right, move from (471,1107) to (662,1414) frame: 2540 to 2900", a track of a target with an id of 139 is displayed, as shown in the right figure, a small circle marked as walk is a starting point of the track, and the target surrounded by a rectangular box is located at an end point of the track. Obviously, the steering situation of the target is steering right, thus verifying the correctness of the result.

FIG. 9 is a schematic diagram of showing the group identification result in the video. In the figure, a dark box represents a single target, a light box represents one target group, and the targets in the same light box belong to the same group. It can be seen that there are four target groups in the figure. The two figures at the bottom of FIG. 9 are typical examples, which reflect an anti-interference ability of this algorithm. Positions of the lower two groups in the lower left figure of FIG. 9 are not changed, and the upper right group passes through a middle of the lower two groups and reaches a lower left of the two groups, like the position as shown in the right figure. In the whole process, the group identification result remains stable. Although the upper right groups in the left figure are very close in space when passing through the lower two groups, the system does not misjudge the groups as the same group, which avoids errors well.

As can be seen from the scene analysis result shown in FIG. 10, this is a screenshot of an intersection video. The scene analysis counts number of targets that have entered and left at each intersection in real time, and prints statistical results at the intersection. The statistical results are verified without error. In FIG. 10, the single-target long-time semantic results are mapped into result strings, and several kinds and forms of the result strings are as follows (italics represent variables):

Enter. "kind+id: come in, frame: frame". For example, "bike91: come in, frame:300".

Leave. "kind+id: leave, frame: frame". For example, "pedestrian53: leave, frame:1490".

Stay. "kind+id: stay at(x, y), frame: frame1 to frame2". For example, "pedestrian94: stay at(1418,640) frame:950 to 1040".

Move. "kind+id: turn, move from (x1, y1) to (x2, y2) frame: frame1 to frame2", wherein turn has three situations, which are respectively "go straight", "turn left" and "turn right". For example, "bike121: go straight, move from (682,39) to (694,586) frame:270 to 450".

From the semantic representation method based on the aerial surveillance video provided in the foregoing embodiments, it can be known that this method introduces the identification process to improve the traditional video event identification methods based on the syntactic structure, so that this method can handle multi-target events and parallel events. Moreover, the semantic tuple, a structured semantic model, is used to represent the sub-events of the target. This structured model is convenient for a computer to calculate and process semantic symbols. This method directly uses the tracking results of the target as input data, but does not use low-level (pixel) and middle-level (color, texture, etc.) features of the video, which is equivalent to directly filtering redundant information in the video data. This is because that the middle-level features have almost no semantic meaning. It is proved through the specific embodiments that this method can deal with the multi-target events and the parallel events in the scene, and improve the processing efficiency of the parallel events, and improve the semantic representation effects on the multi-target events and the parallel events in the air surveillance video.

Figure 11:
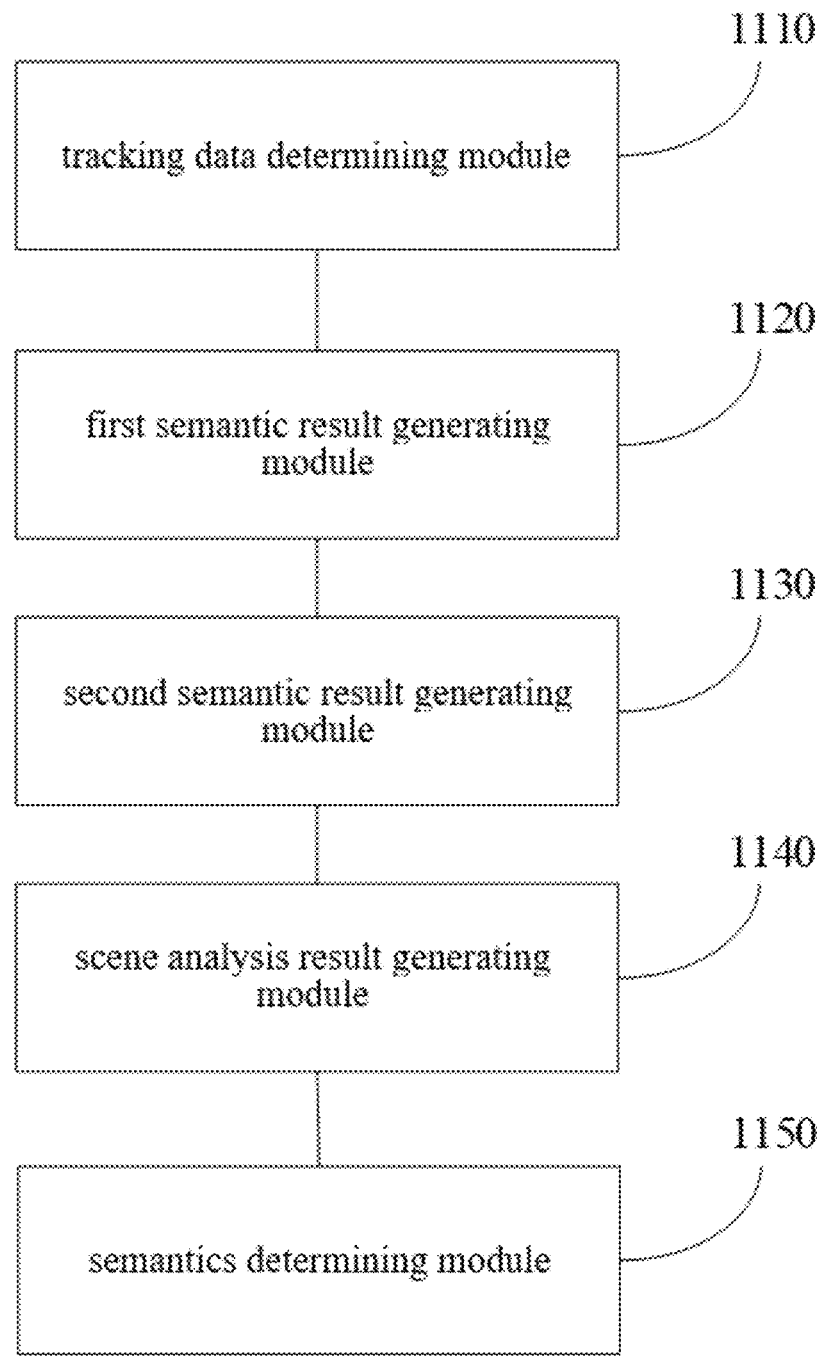
FIG. 11 is a schematic structural diagram of a semantic representation system based on an aerial surveillance video provided by an embodiment of the present disclosure.

Corresponding to the method embodiments, an embodiment of the present disclosure provides a semantic representation system based on aerial surveillance video. A schematic structural diagram of the system is shown in FIG. 11, wherein the system includes:

a tracking data determination module 1110 configured for tracking a target in a surveillance video and determining tracking data of the target; wherein, the target refers to a pedestrian and a running vehicle;

a first semantic result generation module 1120 configured for inputting a coordinate track of the target into a first semantic classifier to output a first semantic result of the target; wherein, the first semantic result represents a behavior of the target in an interval lower than a preset time;

a second semantic result generation module 1130 configured for performing semantic merging on the first semantic result, and inputting an obtained semantic merging result into a second semantic classifier to output a second semantic result of the target; wherein, the second semantic result represents a steering situation of the target in an interval no less than the preset time;

a scene analysis result generation module 1140 configured for, according to the tracking data of the target and a preset tab in the surveillance video, analyzing a scene in the surveillance video to obtain a scene analysis result; and a semantics determination module 1150 configured for performing cluster analysis on the first semantic result to obtain a target group of the target, and according to the target group of the target, the scene analysis result and the second semantic result, determining semantics of the surveillance video.

The semantic representation system based on the aerial surveillance video in this embodiment has the same technical features as the semantic representation method based on the aerial surveillance video provided in the above method embodiments, so the system can also solve the same technical problems and achieve the same technical effects. For brief description, for those not mentioned in this embodiment, please refer to the corresponding contents in the aforementioned method embodiments.

Figure 12:
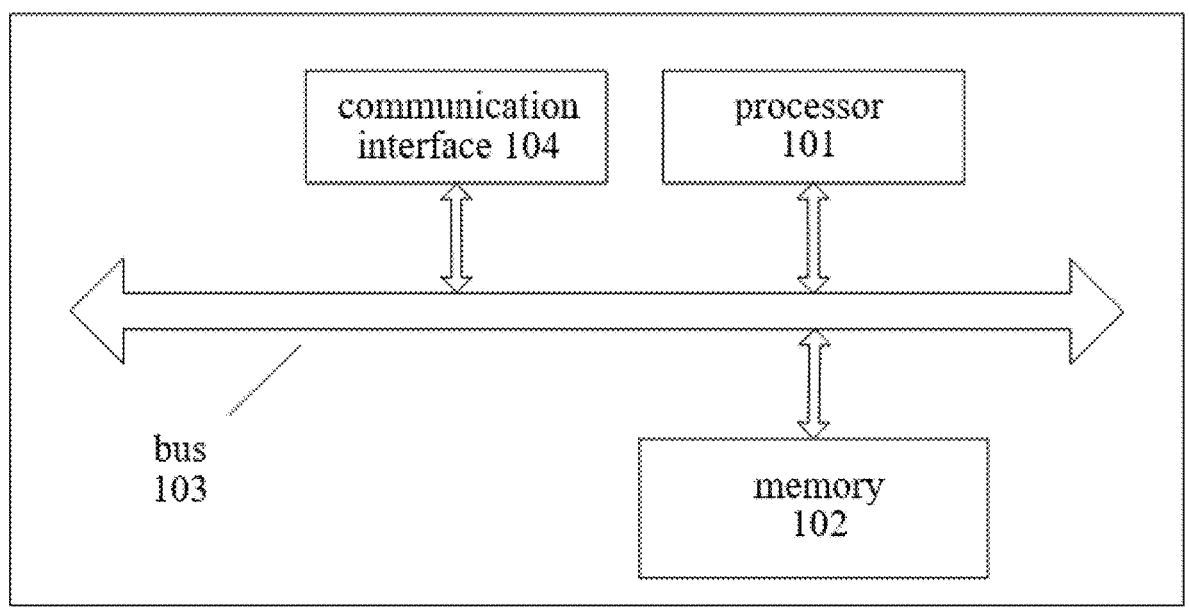
FIG. 12 is a schematic structural diagram of an electronic device provided by an embodiment of the present disclosure.

The embodiment also provides an electronic device, wherein a schematic structural diagram of the electronic device is shown in FIG. 12. The device includes a processor 101 and a memory 102; wherein the memory is configured for storing one or more computer instructions, wherein the one or more computer instructions, when executed by the processor, implements the above-mentioned semantic representation method based on the aerial surveillance video.

Figure 2:
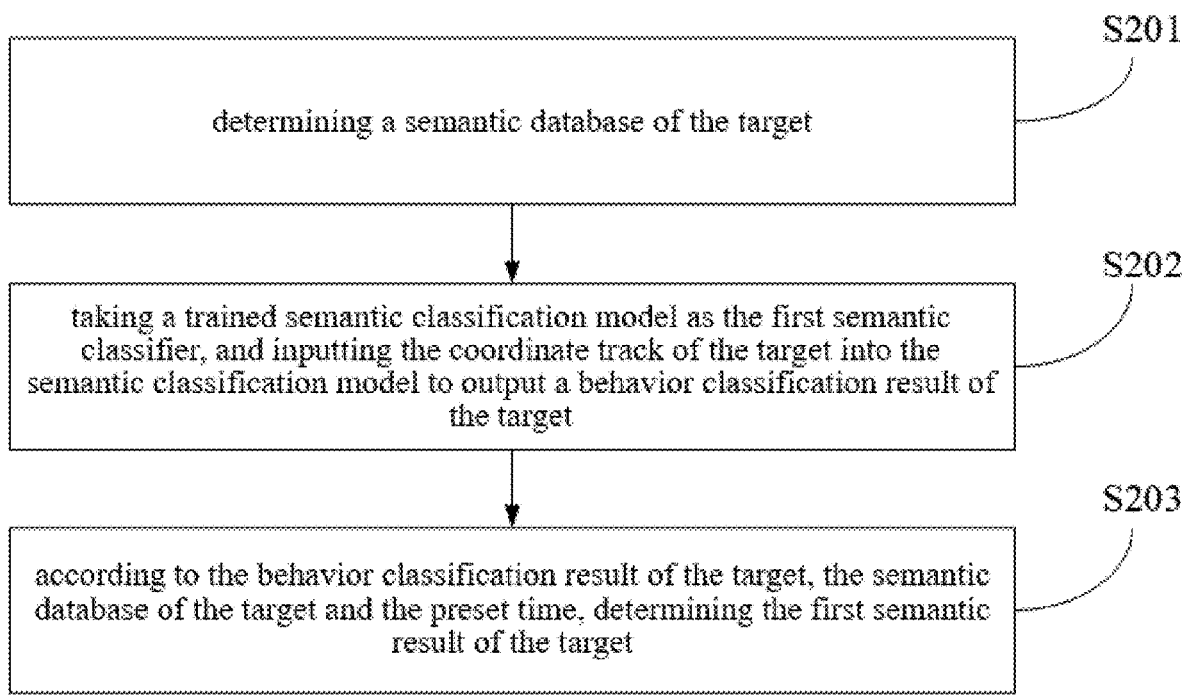
FIG. 2 is a flow chart of step S102 in the semantic representation method based on the aerial surveillance video provided by the embodiment of the present disclosure.

The electronic device as shown in FIG. 2 further includes a bus 103 and a communication interface 104. The processor 101, the communication interface 104 and the memory 102 are connected through the bus 103.

The memory 102 may include a high speed Random Access Memory (RAM), and may also include a non-volatile memory, for example, at least one disk memory. The bus 103 may be an ISA bus, a PCI bus, or an EISA bus, or the like. The bus may be divided into an address bus, a data bus, a control bus, etc. For convenience of illustration, the bus is represented by one double-headed arrow only in FIG. 12, but it does not mean that there is only one bus or one kind of bus.

The communication interface 104 is configured for being connected with at least one user terminal and other network element through the communication interface, and sending an encapsulated IPv4 message or an IPv4 message to the user terminal through a network interface.

The processor 101 may be an integrated circuit chip with a signal processing capacity. In the implementation process, the steps in the foregoing methods may be completed using an integrated logic circuit of hardware or an instruction in a form of software in the processor 101. The above-mentioned processor 101 may be a general-purpose processor, including a Central Processing Unit (CPU), a Network Processor (NP); and may also be a Digital Signal Processor (DSP), an Application Specific Integrated Circuit (ASIC), a Field-Programmable Gate Array (FPGA) or other programmable logic device, a discrete gate, or a transistor logic device, and a discrete hardware assembly. The methods, steps, and logic diagrams disclosed in the embodiments of the present disclosure may be implemented or executed by the processor. The general-purpose processor may be a microprocessor or the processor may be any conventional processor, or the like. Steps of the methods disclosed with reference to the embodiments of the present disclosure may be directly executed and accomplished by means of a hardware decoding processor or may be executed and accomplished using a combination of hardware and software modules in the decoding processor. The software module may be located in a mature storage medium in the art, such as a random access memory, a programmable read-only memory, or an electrically erasable programmable memory, a register, etc. The storage medium is located in the memory 102. The processor 101 reads information from the memory 102 and completes the steps of the foregoing methods in combination with the hardware of the processor.

An embodiment of the present disclosure further discloses a computer-readable storage medium storing a computer program thereon, wherein the computer program, when executed by a processor, implements the steps of the method in the forgoing embodiments.

In the several embodiments provided in the present application, it should be understood that the disclosed systems, devices and methods may be implemented in other ways. The device embodiments described above are merely illustrative. For example, the division of the units is only one logical function division. In practice, there may be other division methods. For another example, multiple units or components may be combined or integrated into another system, or some features may be ignored or not performed. In addition, the illustrated or discussed mutual coupling or direct coupling or communication connection may be indirect coupling or communication connection through some communication interfaces, devices or units, and may be in electrical, mechanical or other forms.

The units illustrated as separation parts may either be or not physically separated, and the parts displayed as units may either be or not physical units, i.e., the parts displayed as units may be located in one place or distributed to multiple network units. Some or all of the units may be selected according to actual needs to achieve the objects of the solutions in the embodiments.

In addition, each functional unit in each embodiment of the present disclosure may be integrated in one processing unit, or each unit may exist alone physically, or two or more units may be integrated in one unit.

If the functions are realized in the form of software functional units and sold or used as independent products, the functions may be stored in a non-volatile computer-readable storage medium executable by a processor. Based on such understanding, the essence of the technical solutions of the present disclosure, or the part contributing to the prior art or all or a part of the technical solutions, may be embodied in the form of a software product. The computer software product is stored in a storage medium including a number of instructions such that a computer device (which may be a personal computer, a server, or a network device, etc.) performs all or a part of steps of the method described in each of the embodiments of the present disclosure. The foregoing storage medium includes: any medium that is capable of storing program codes such as a USB disk, a mobile hard disk, a Read-Only Memory (ROM), a Random Access Memory (RAM), a magnetic disk or an optical disk, and the like.

Finally, it should be noted that the above embodiments are only specific embodiments of the present disclosure, which are used to illustrate the technical solutions of the present disclosure, but are not intended to limit the technical solutions. The protection scope of the present disclosure is not limited to this. Although the present disclosure has been described in detail with reference to the aforementioned embodiments, it should be understood by those of ordinary skills in the art that anyone familiar with the technical field can still modify or easily think of changes to the technical solutions described in the aforementioned embodiments within the technical scope disclosed by the present disclosure, or replace some of the technical features equally; however, these modifications, changes or replacements do not make the essence of the corresponding technical solutions deviate from the spirit and scope of the technical solutions of the embodiments of the present disclosure, and should be covered within the protection scope of the present disclosure. Therefore, the protection scope of the present disclosure should be subjected to the protection scope of the claims.

What is claimed is:

1. A semantic representation method based on an aerial surveillance video, comprising the following steps:
   1) tracking a target in the aerial surveillance video, and determining tracking data of the target; wherein, the target refers to a pedestrian or a running vehicle;
   2) inputting a coordinate track of the target into a first semantic classifier to output a first semantic result of the target; wherein, the first semantic result represents a behavior of the target in an interval lower than a preset time;
   3) performing semantic merging on the first semantic result to obtain a semantic merging result, and inputting the semantic merging result into a second semantic classifier to output a second semantic result of the target; wherein, the second semantic result represents a steering situation of the target in an interval no less than the preset time;
   4) analyzing a scene in the aerial surveillance video to obtain a scene analysis result, according to the tracking data of the target and a preset tab in the aerial surveillance video; and
   5) performing cluster analysis on the first semantic result to obtain a target group of the target, and determining semantics of the aerial surveillance video, according to the target group of the target, the scene analysis result, and the second semantic result.

2. The semantic representation method based on the aerial surveillance video according to claim 1, wherein the step 2 of inputting the coordinate track of the target into the first semantic classifier to output the first semantic result of the target comprises:
   determining a semantic database of the target;
   taking a trained semantic classification model as the first semantic classifier, and inputting the coordinate track of the target into the first semantic classifier to output a behavior classification result of the target; and
   determining the first semantic result of the target, according to the behavior classification result of the target, the semantic database of the target, and the preset time.

3. The semantic representation method based on the aerial surveillance video according to claim 2, wherein a support vector machine model is used as the trained semantic classification model, a kernel function used in the trained semantic classification model is a Gaussian kernel function, and a sklearn library function is used in the training process of the trained semantic classification model.

4. The semantic representation method based on the aerial surveillance video according to claim 1, wherein the step of performing the semantic merging on the first semantic result comprises:
   initializing a semantic tuple; wherein, the semantic tuple is a five-element array set; and
   mapping the first semantic result into an initialized semantic tuple to complete the semantic merging;
   wherein,
   a first set in the five-element array set contains two first numerals, the first two numerals are configured to store an id of the target and a type of the target;
   a second set in the five-element array set contains second numerals, the second numerals are configured to store a semantic classification result;
   a third set of the five-element array set contains two vectors, the two vectors are configured to store an abscissa sequence and an ordinate sequence of the target in a current time interval;
   a fourth set in the five-element array set contains two third numerals, the two third numerals are a header frame number and a tail frame number of a time interval to which the semantic tuple belongs; and
   a fifth set in the five-element array set is a list, the list is configured to record all member ids of the target group in the time interval to which the semantic tuple belongs.

5. The semantic representation method based on the aerial surveillance video according to claim 4, wherein the step 5 of performing the cluster analysis on the first semantic result to obtain the target group of the target comprises:
   acquiring semantic tuples with the fourth set in the first semantic result, and recording the semantic tuples as temporary semantic tuples;
   sampling third sets in the temporary semantic tuples according to a time sequence to obtain a sampling result; wherein, the sampling result refers to a plurality of multidimensional vectors, and a number of the multidimensional vectors is the same as a number of the target;
   clustering the multidimensional vectors for multiple times by using a scipy library function, and saving a clustering result in a preset dictionary; and inputting the preset dictionary into a preset graph data structure, and determining the target group of the target.

6. The semantic representation method based on the aerial surveillance video according to claim 5, wherein the step 3 of performing the semantic merging on the first semantic result, and inputting the obtained semantic merging result into the second semantic classifier to output the second semantic result of the target further comprises:

arranging semantic tuples of different periods in the target according to the time sequence to obtain a first temporary sequence; wherein, the first temporary sequence represents a movement situation of the target in each time period;

inputting the first temporary sequence into a preset error correction unit to obtain a second temporary sequence, and taking the second temporary sequence as the semantic merging result; and taking a trained steering classification model as the second semantic classifier, inputting the semantic merging result into the second semantic classifier to output a steering classification result of the target, and taking the steering classification result of the target as the second semantic result of the target.

7. The semantic representation method based on the aerial surveillance video according to claim 6, wherein a bp neural network model is used as the trained steering classification model; the bp neural network model comprises 40 input layer nodes, 12 hidden layer nodes and 3 output layer nodes; a ReLU activation function is used between an input layer and a hidden layer, and a softmax activation function is used between the hidden layer and an output layer; and the data set is divided into a training set, a validation set, and a test set according to proportions of 60%, 20% and 20%; and a cross-entropy loss function is selected in a training process of the bp neural network model.

8. A semantic representation system based on an aerial surveillance video, wherein the semantic representation system is configured to perform operations comprising:

tracking a target in the aerial surveillance video and determining tracking data of the target;

wherein, the target refers to a pedestrian or a running vehicle;

inputting a coordinate track of the target into a first semantic classifier to output a first semantic result of the target, wherein, the first semantic result represents a behavior of the target in an interval lower than a preset time;

performing semantic merging on the first semantic result to obtain a semantic merging result, and inputting the semantic merging result into a second semantic classifier to output a second semantic result of the target; wherein, the second semantic result represents a steering situation of the target in an interval no less than the preset time;

analyzing a scene in the aerial surveillance video to obtain a scene analysis result, according to the tracking data of the target and a preset tab in the aerial surveillance video; and performing cluster analysis on the first semantic result to obtain a target group of the target, and determining semantics of the aerial surveillance video according to the target group of the target, the scene analysis result, and the second semantic result.

9. An electronic device, comprising: a processor and a storing device; wherein a computer program is stored on the storing device, and the computer program, when executed by the processor, executes the steps of the semantic representation method based on the aerial surveillance video according to claim 1.

10. A nonvolatile non-transitory computer-readable storage medium, storing a computer program thereon, wherein the computer program, when executed by a processor, executes the steps of the semantic representation method based on the aerial surveillance video according to claim 1.

* * * * *